(12) United States Patent
Ando (10) Patent No.: US 6,476,815 B1
(45) Date of Patent: Nov. 5, 2002

(54) INFORMATION PROCESSING APPARATUS AND METHOD AND INFORMATION TRANSMISSION SYSTEM

(75) Inventor: Tsutomu Ando, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,622

(22) Filed: Oct. 18, 1999

(30) Foreign Application Priority Data

Oct. 19, 1998 (JP) .......................................... 10-297280

(51) Int. Cl.[7] .............................................. G06T 15/00
(52) U.S. Cl. ...................................................... 345/473
(58) Field of Search ................................ 345/473, 474, 345/475; 434/167, 169, 185

(56) References Cited

U.S. PATENT DOCUMENTS 5,367,454 A * 11/1994 Kawamoto et al. ....... 364/419.2
6,230,111 B1 * 5/2001 Mizokawa .................. 702/182
6,250,928 B1 * 6/2001 Poggio et al. .............. 434/185

* cited by examiner

*Primary Examiner*—Phu K. Nguyen
(74) *Attorney, Agent, or Firm*—Fitzpatrick, Cella, Harper & Scinto (57) ABSTRACT

A receiver receives data made up of a text block for voice synthesis containing animation control information, and animation data. A demultiplexer extracts the animation data from the data, and stores the animation data in an external storage device. The demultiplexer extracts the text block for voice synthesis from the received data, and provides the text block to a text reading-off unit to perform voice synthesis/output. Along with the progress of voice synthesis, the demultiplexer extracts the animation control information from the text block of the received data. An animator controls display of the animation data stored in the external storage device in accordance with the extracted animation control information.

34 Claims, 11 Drawing Sheets

```
<HEAD>
<NAME>Taro Yamada</NAME>
<GENDER> Male</GENDER>
</HEAD>
<SMILE>  Hello ! How are you ? </SMILE>
<NORMAL>  May I ask your advice ? </NORMAL>
Recently, <PAIN> I have a stomach trouble. </PAIN>
<NORMAL> Do you know any good relief ?
```

FIG. 4B

Hello ! How are you ?

May I ask your advice ?

Recently, I have a stomach trouble.

FIG. 4C

Transmitter : Taro Yamada

Gender : Male

| NAME | GENDER | MAIL ADDRESS | ANIMATION DATA |
|---|---|---|---|
| Taro Yamada | Male | xxx.co.jp | < SMILE > |
| | | | < NORMAL > |
| | | | < PAIN > |
| | | | < ····· > |

```
<HEAD>
<NAME>Taro Yamada</NAME>
<GENDER> Male</GENDER>
</HEAD>
<AVATAR>
<FACE>Slim</FACE>
<HAIR>Long</HAIR>
<EYE>Blue</EYE>
<OPTION>Glasses</OPTION>
</AVATAR>
```

FIG. 10B

Transmitter : Taro Yamada

Gender : Male

FIG. 10C

Face : Slim

Hair : Long Hair

Eye Color : Blue

Option : Glasses

FIG. 11

| ABATAR ATTRIBUTE | | | | ANIMATION DATA |
|---|---|---|---|---|
| < FACE > | < HAIR > | < EYE > | < OPTION > | |
| Slim | Long | Blue | Glasses | < SMILE > |
| | | | | < NORMAL > |
| | | | | < PAIN > |
| | | | | < · · · · · > |

# INFORMATION PROCESSING APPARATUS AND METHOD AND INFORMATION TRANSMISSION SYSTEM

BACKGROUND OF THE INVENTION

1. Field of the Invention

The present invention relates to an information processing apparatus and information transmission system and, more particularly, to an information processing apparatus and information transmission system suitable for transmitting/receiving voice information and image information.

2. Description of the Related Art

Image/voice transmission systems such as a video conference system and video phone for transmitting/receiving voice information and image information have conventionally been known.

A conventional image/voice transmission system performs the following control. An object is photographed by a video camera to obtain image information to be transmitted. At the same time, a speaker's voice is received via a microphone to obtain voice information to be transmitted. The image information and voice information to be transmitted are respectively encoded (compressed) by a video encoder and audio encoder. The compressed image information and voice information are multiplexed by a multiplexer, and the multiplexed image and voice data is transmitted.

An information processing apparatus which received the transmitted multiplexed image and voice data demultiplexes this data into image data and voice data by a demultiplexer, and decodes them to reconstruct an image and voice. In reconstruction, the image and voice are synchronized.

The encoding method includes various methods. In the above example, (compressed) natural moving picture data and voice data are transmitted. This is widely used in the video conference and video phone.

There is also proposed transmission of animation data and text data instead of transmission of natural moving picture data and voice data. For example, animation information of a face and body is extracted from an image obtained by a video camera to create an abstracted abatar as animation data. Text data is obtained by recognizing a speaker's voice input via a microphone and converting the voice into a text. The avatar animation data and text data are multiplexed by a multiplexer and transmitted.

On the receiving side, the animation of the face and body is displayed based on the animation data, whereas the text data is converted into voice signals and read off. In this case, the animation and voice must be synchronized, as a matter of course.

The above example is effective for a transmission path having a narrow band (low bit rate).

Instead of receiving animation data and text data using a video camera and microphone, animation data including the movements and expressions of a body and face may be created by an animator, and a text subjected to voice synthesis may be edited using a text editor.

However, the above information transmission system suffers the following problems.

The transmission method of compressing a natural moving picture and voice is difficult to cope with a transmission path having a narrow band (low bit rate).

The method of transmitting information as animation data and text data is suitable for a transmission path having a low bit rate. However, the animation data and text data are completely independent of each other. For this reason, although conversion of the text data into voice data must be synchronized with the animation data, it is difficult to accurately synchronize displaying the animation with reading off the text.

SUMMARY OF THE INVENTION

The present invention has been made to overcome the conventional drawbacks, and has as its object to easily, accurately synchronize displaying animation data with reading off text data.

It is another object of the present invention to hold animation data on the receiving side so as not to transmit animation data every transmission of a text to be read off.

To achieve the above objects, an information processing apparatus according to one aspect of the present invention comprises the following arrangement.

That is, an information processing apparatus comprises
  reception means for receiving data containing animation control information in a text block for voice synthesis,
  storage means for storing animation data,
  voice output means for extracting the text block for voice synthesis from the data received by the reception means, and synthesizing a voice based on the extracted text block to output the voice, and
  display control means for controlling display of the animation data stored in the storage means, on the basis of a position of the text block output as a voice by the voice output means, and a position of the animation control information.

The present invention provides an information processing method implemented by the information processing apparatus. The present invention provides a storage medium which stores a control program for causing a computer to implement the information processing method. Further, the present invention provides an information transmission system using the information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
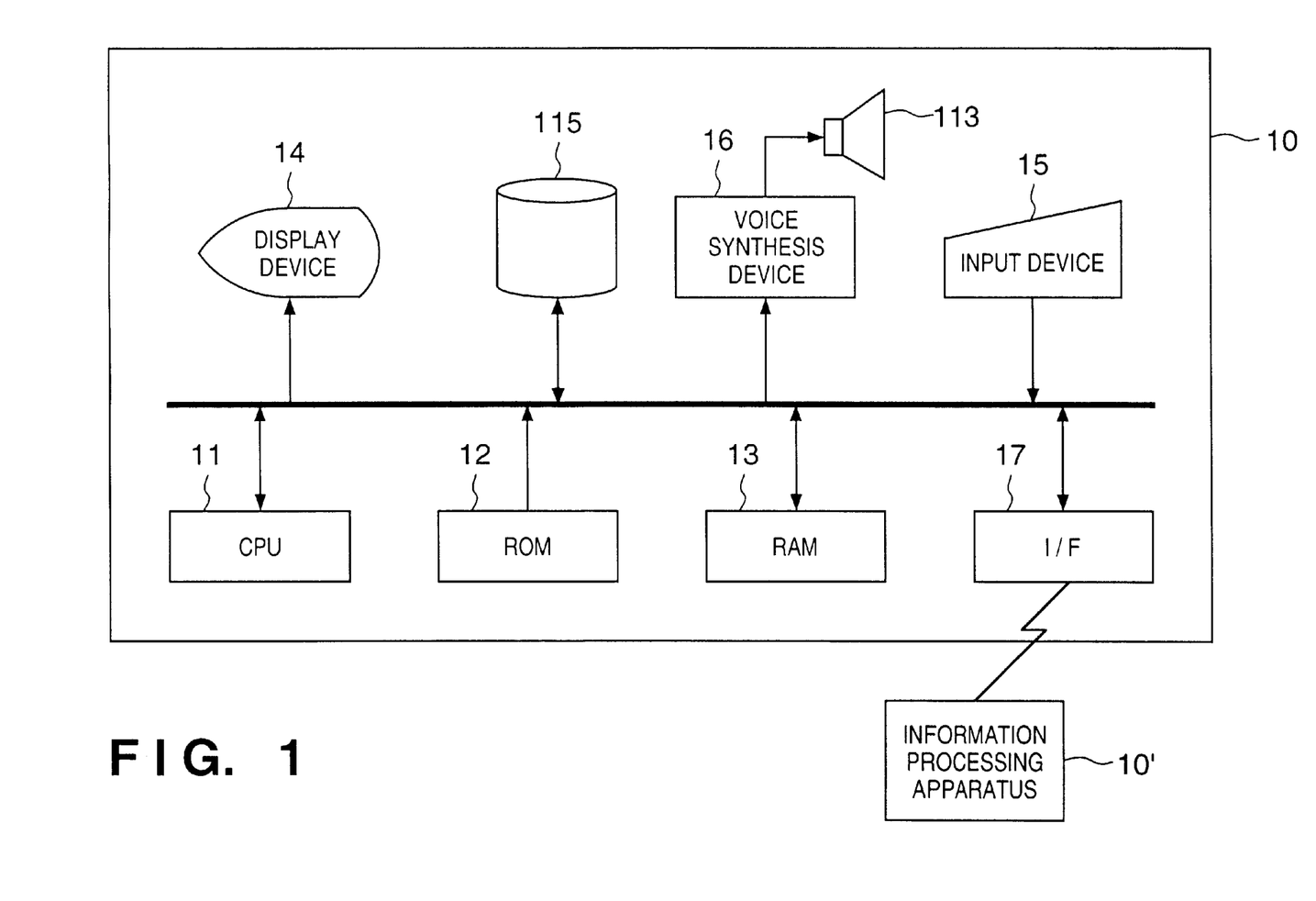
FIG. 1 is a block diagram showing an example of the arrangement of an information processing apparatus according to the first embodiment.

FIG. 1 is a block diagram showing an example of the arrangement of an information processing apparatus according to the first embodiment. In FIG. 1, reference numeral 10 denotes an information processing apparatus; 11, a CPU for realizing various control operations of the information processing apparatus 10; 12, a ROM which stores control programs and various data executed by the CPU 11; 13, a RAM for storing control programs to be executed by the CPU 11 that are loaded from an external storage device, and providing a work area in executing various control operations by the CPU 11.

Reference numeral 14 denotes a display device for realizing various displays under the control of the CPU 11; 15, an input device including a keyboard and pointing device (mouse and the like); 16, a voice synthesis device; 17, an interface for connecting a line and information processing apparatus 10; and 18, a bus.

Reference numeral 113 denotes a speaker for producing a voice output from the voice synthesis device 16; 115, an external storage device; and 10', an information processing apparatus which is connected to the information processing apparatus 10 via a line and has the same arrangement as described above. In the first embodiment, both the information processing apparatuses 10 and 10' function as a data transmitting side and receiving side.

Figure 2:
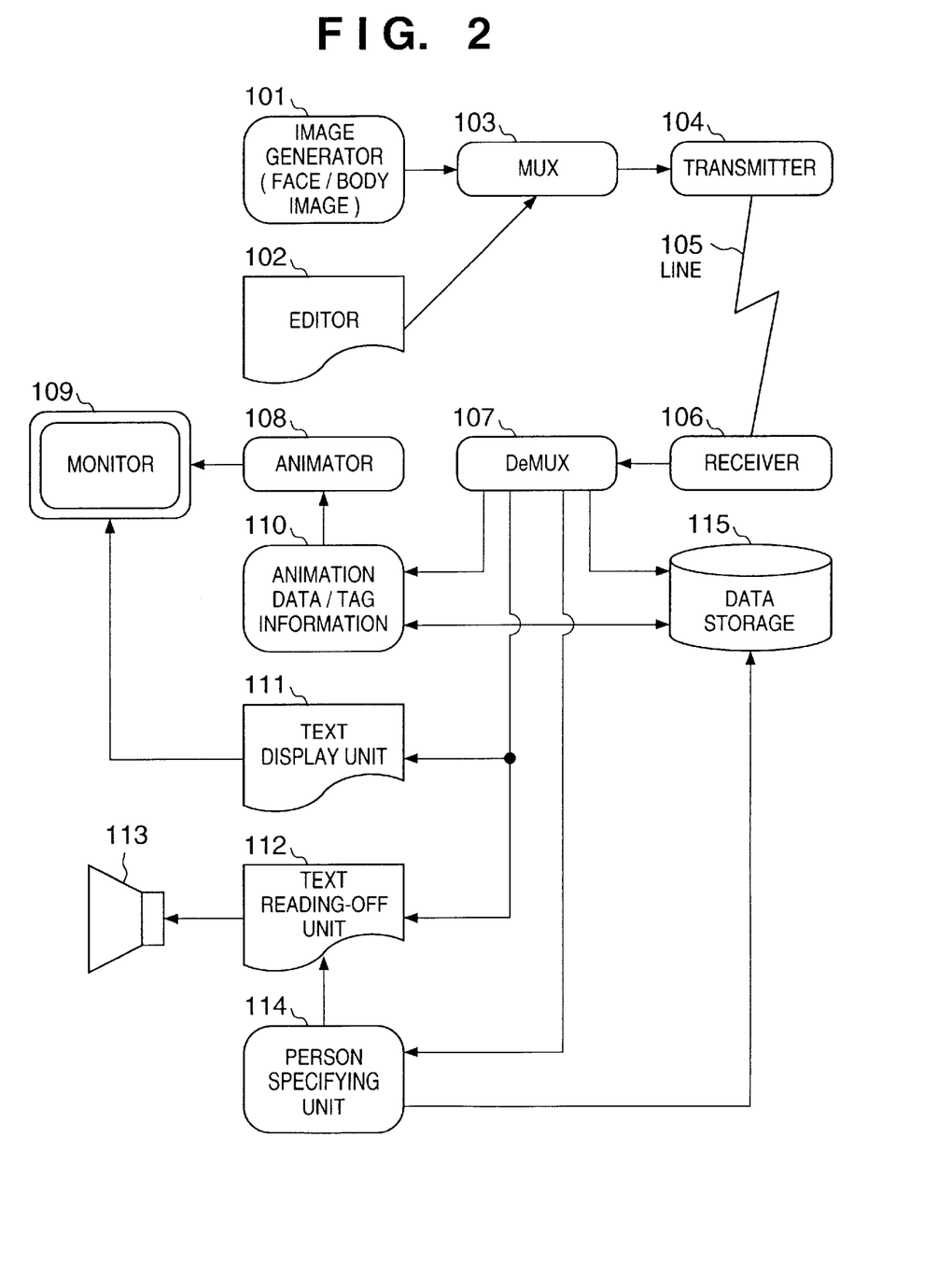
FIG. 2 is a block diagram for explaining a functional arrangement concerning information transmission according to the first embodiment.

FIG. 2 is a block diagram for explaining a functional arrangement concerning information transmission and information reconstruction according to the first embodiment.

The functional arrangement on the data transmitting side will be explained. In FIG. 2, reference numeral 101 denotes an image generator for generating an image serving as the animation original of the face and body of a person. The image may be a person's image similar to a transmitter or an avatar image different from the transmitter. In any case, the image need not be animated. It suffices to draw the frame and characteristics of a person as a still image, and determine characteristics (eye position, mouth position, and the like) necessary for an animation.

Figure 3:
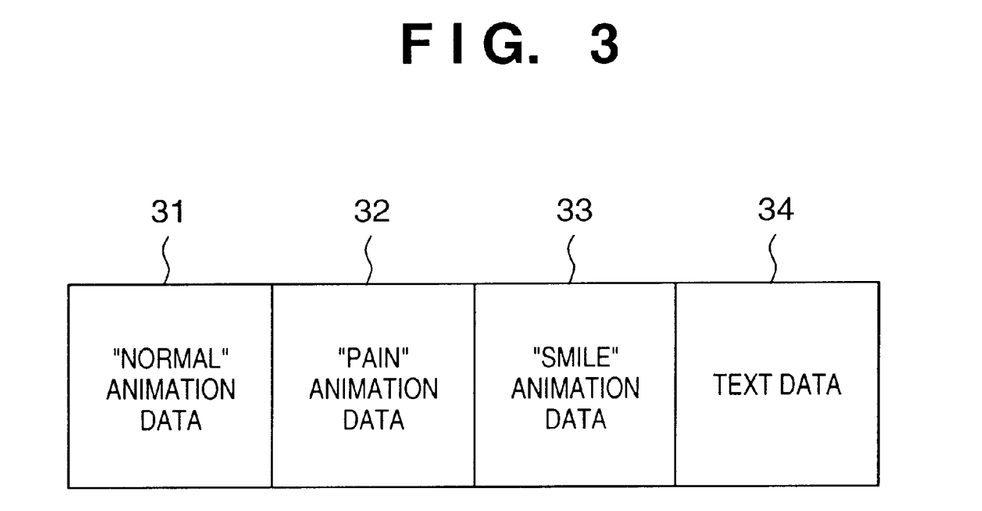
FIG. 3 is a view showing an example of the structure of transmission data according to the first embodiment.

Reference numeral 102 denotes a text editor for editing a text subjected to voice synthesis. A text is edited using the input device 15. The edited text contains an animation tag for designating an animation in outputting a synthesized voice, as will be described later. Reference numeral 103 denotes a multiplexer for multiplexing an image and text to generate transmission data like the one shown in FIG. 3. FIG. 3 is a view showing an example of the structure of transmission data according to the first embodiment. Reference numerals 31 to 33 denote animation data corresponding to animation tags (to be described later); and 34, text data created by the text editor 102.

Referring back to FIG. 2, reference numeral 104 denotes a transmitter for transmitting transmission data to an external information processing apparatus which is designated or requests data.

Reference numeral 105 denotes a transmission path or line. The type of transmission path (analog or digital) is not particularly limited.

On the receiving side, transmission data is received to reconstruct a voice and image. Reference numeral 106 denotes a receiver for receiving the transmission data transmitted via the line 105; and 107, a demultiplexer for demultiplexing the received transmission data into animation data (31 to 33 in FIG. 3) and text data (34), and demultiplexing the text data 34 into an animation tag (to be described below), text information to be read off (or displayed), and header data.

Reference numeral 110 denotes animation data (31 to 33) and animation tag information obtained by demultiplexing the transmission data; 108, an animator for performing animation processing based on the animation data and animation tag information to display an animation on a monitor 109 (display device 14); 111, a text display unit for displaying a text based on text information to be read off; 112, a text reading-off unit for synthesizing a voice based on the text information to be read off, and outputting voice signals; and 113, a speaker for producing a voice by the voice signals output from the text reading-off unit 112. Note that the text display unit 111 is optional.

Header data selected by the demultiplexer is transmitted to a person specifying unit 114 which determines the gender and the like adopted in the text reading-off unit 112. Note that contents determined by the person specifying unit 114 may include the age in addition to the gender. Data (animation data 31 to 33) necessary for an animation are stored in an external storage device 115 (magnetic disk or the like in practice).

Figure 4A:
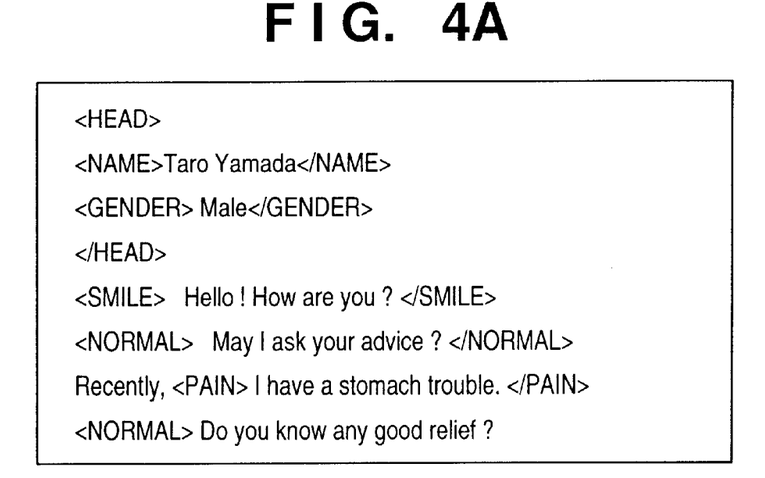
FIGS. 4A to 4C are views showing a text data example and text extraction examples.
Figure 4B:
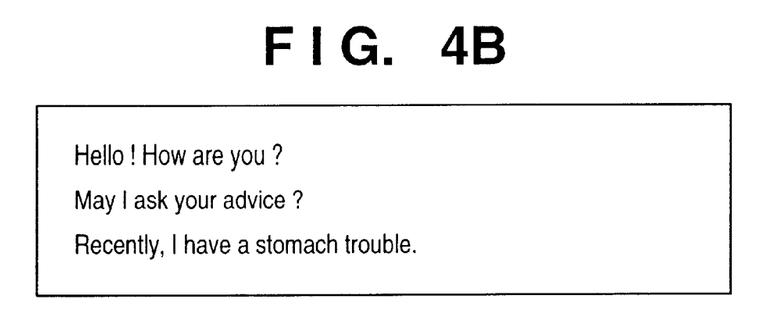
Figure 4C:
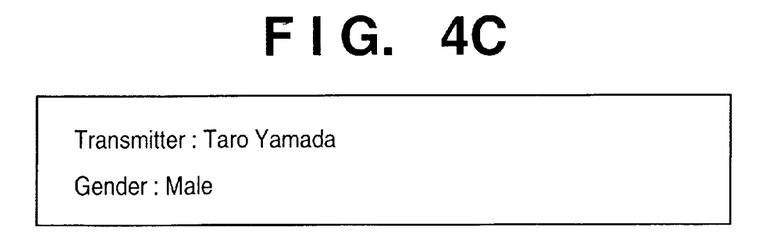

FIGS. 4A to 4C are views showing a text data example and text extraction examples. FIG. 4A shows an example of a letter. Information other than text information is described between "<" and ">" called a tag. This notation method is based on the HTML (HyperText Markup Language). This is merely an example for descriptive convenience, and any format can be used.

In FIG. 4A, the first to fourth lines represent a header which is not a text body, is not processed by the text display unit and text reading-off unit of a receiver, and describe transmitter information. The start and end of the header are described on the first and fourth lines. The transmitter's name is described between <NAME> and </NAME> on the second line. The gender is described between <GENDER> and </GENDER> on the third line.

In FIG. 4A, the text body of the letter is described from the fifth line. The text on the fifth line is sandwiched between <SMILE> and </SMILE>, which means that a smile animation is displayed in reading off the tagged text. Similarly, the sixth line (text between <NORMAL> and </NORMAL>) represents a normal look, and the seventh line (text between <PAIN> and </PAIN>) represents a painful look. By tagging the text in this manner, animation information can be easily transmitted, and displaying the animation can be synchronized with reading off the text.

FIG. 4B shows contents (text body) displayed by the text display unit 111, and FIG. 4C shows header data. The person specifying unit 114 of this embodiment determines the type of synthesized voice (e.g., male voice) using gender information (determines transmitter information).

Figure 5:
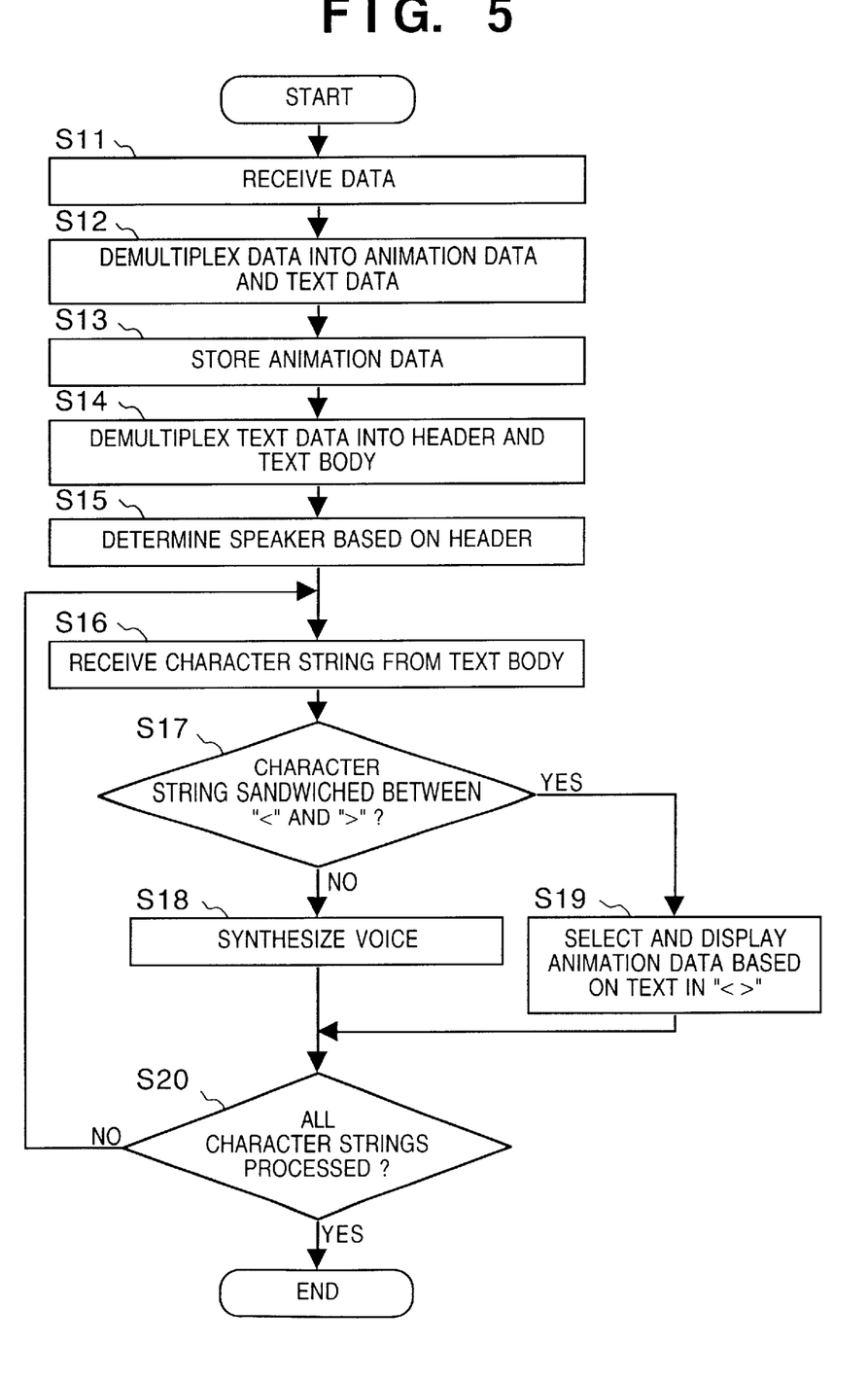
FIG. 5 is a flow chart for explaining animation display and voice synthesis according to the first embodiment.

FIG. 5 is a flow chart for explaining animation display and voice synthesis according to the first embodiment. If the receiver 106 receives transmission data in step S11, the demultiplexer 107 demultiplexes the transmission data into an animation and text in step S12. In step S13, the demultiplexed animation is stored in the external storage device 115.

In step S14, the demultiplexer 107 further demultiplexes the text demultiplexed in step S12 into a header, and a text body including reading-off text data and an animation tag. In step S15, the person specifying unit 114 determines the gender of a synthesized voice and the like on the basis of the header information obtained in step S14.

In steps S16 to S20, the animation tag and reading-off text are extracted from the text body, and the animation is displayed and the text is read off in synchronism with each other.

In step S16, a character string is received from the text body. For example,

① When a character string to be received next starts with "<", a character string up to ">" is received.

② When a character string to be received next does not start with "<", a character string up to the next punctuation mark or "?" or immediately before "<" is received.

In step S17, whether the data received in step S16 is an animation tag sandwiched between "<" and ">" is checked. If YES in step S17, the flow advances to step S19 to select and provide animation data represented by this animation tag to the animator 108. The animator 108 controls display of the animation in accordance with the provided animation data. If NO in step S17, the flow advances to step S18 to provide the character string to the text reading-off unit 112 and synthesize avoice. Note that this character string is also provided to the text display unit 111 and displayed on the monitor 109.

In step S20, whether all the character strings in the text body have been processed is checked. If NO in step S20, the flow returns to step S16. If YES in step S20, the processing ends.

Figure 6A:
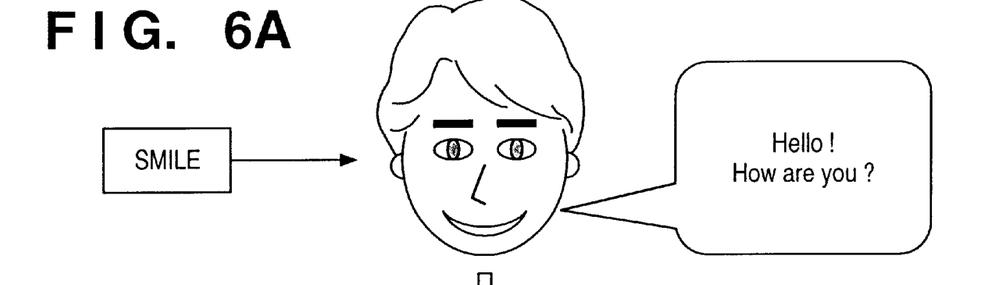
FIGS. 6A to 6D are views showing an example of the flow of animations and texts to be read off.

FIGS. 6A to 6D are views showing an example of the flow of animations and texts to be read off. When processing in step S16 and subsequent steps is applied to the text body shown in FIGS. 4A to 4C, <SMILE> is read out and determined as an animation tag. In step S19, an animation corresponding to <SMILE> is displayed on the monitor 109. "Hello!" is read out, and this text block, which is not an animation tag, is provided to the text reading-off unit 112 in step S18. As a result, as shown in FIG. 6A, an animation corresponding to <SMILE> and a voice "Hello!" are output.

A subsequently extracted character string represents "How are you?". Since this character string is not an animation tag, an utterance "How are you?" is synthesized while maintaining the animation (step S19).

Figure 6B:
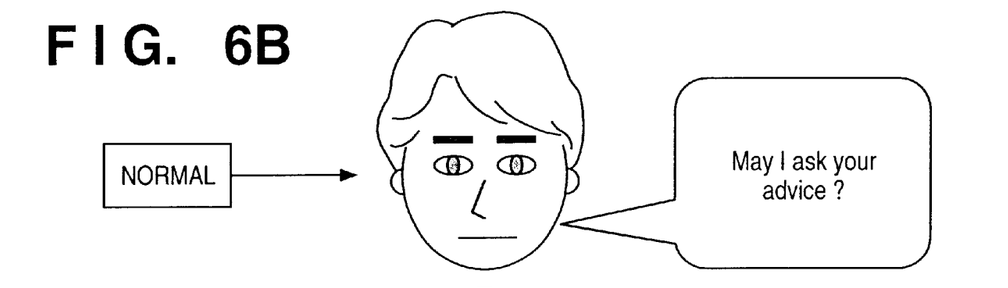
Figure 6C:
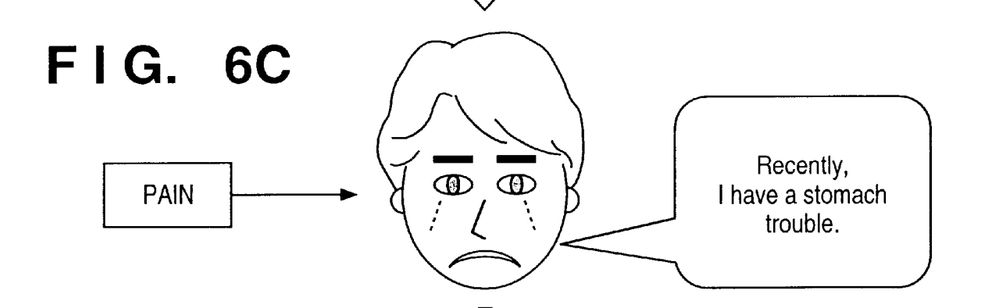
Figure 6D:
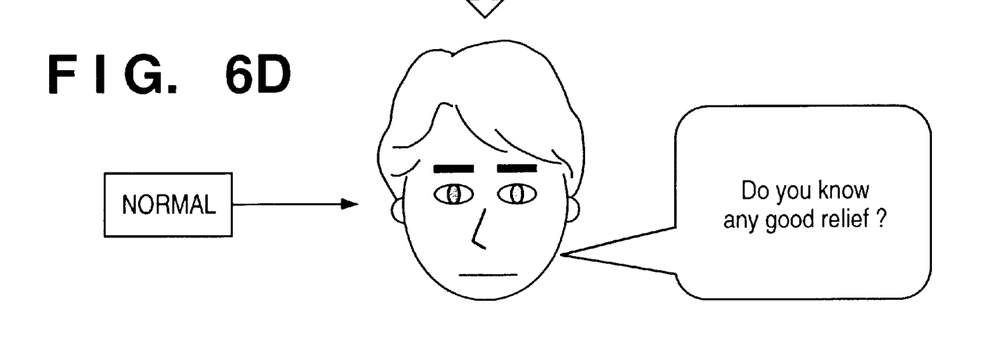

Then, "</SMILE>" and "<NORMAL>" are extracted, and an animation corresponding to a normal look is selected and displayed in step S19. A subsequent character string undergoes voice synthesis (FIG. 6B). The same processing is repeated to perform animation display and voice synthesis shown in FIGS. 6C and 6D. That is, the face animation changes in the order of smile→normal look→painful look→normal look in accordance with the text contents.

According to the first embodiment, since animation information expressing the face/body movements and expressions of a person is superposed on text information to be transmitted, the animation information can be easily transmitted and displayed, and reading off the text can be easily synchronized with displaying the animation.

[Second Embodiment]

In the first embodiment, transmission data contains animation data for displaying an animation in reading off a text. Alternatively, animation data may be prepared in the receiving-side apparatus in advance.

Figure 7:
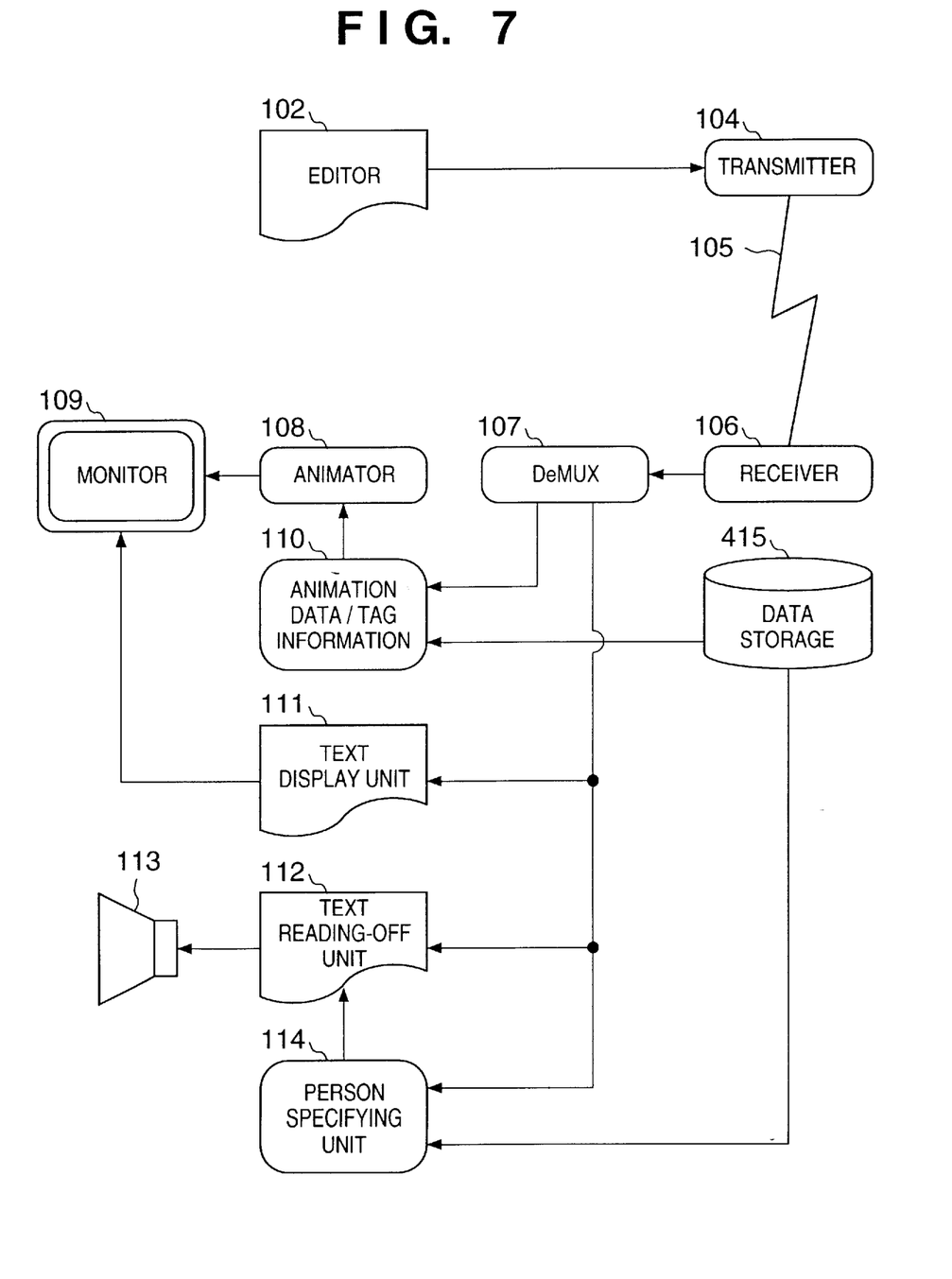
FIG. 7 is a block diagram for explaining a functional arrangement concerning information transmission according to the second embodiment.
Figure 8:
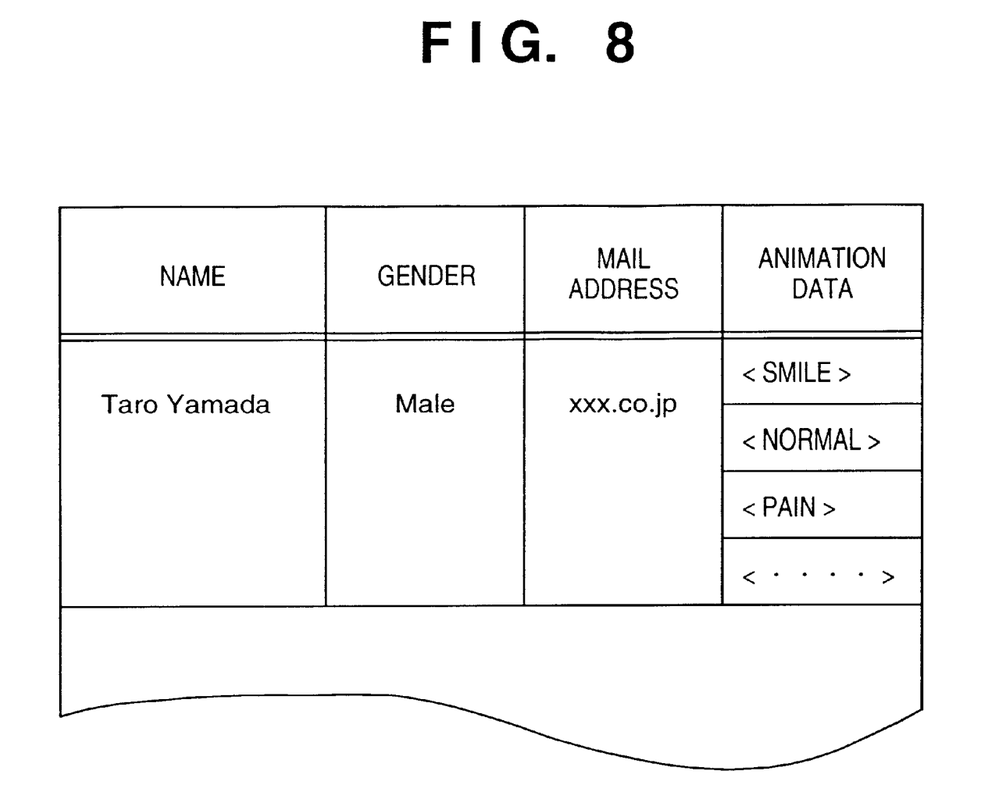
FIG. 8 is a table showing the storage state of animation data according to the second embodiment.

FIG. 7 is a block diagram for explaining a functional arrangement concerning information transmission according to the second embodiment. The functional arrangement of the second embodiment is different from that of the first embodiment shown in FIG. 2 in that the image generator 101 for generating animation data is omitted, and an external storage device 415 stores animation data in advance. FIG. 8 is a table showing the storage state of animation data according to the second embodiment. As shown in FIG. 8, attributes (name, gender, and mail address) used as person specifying information correspond to an animation data set representing facial expressions.

Figure 9:
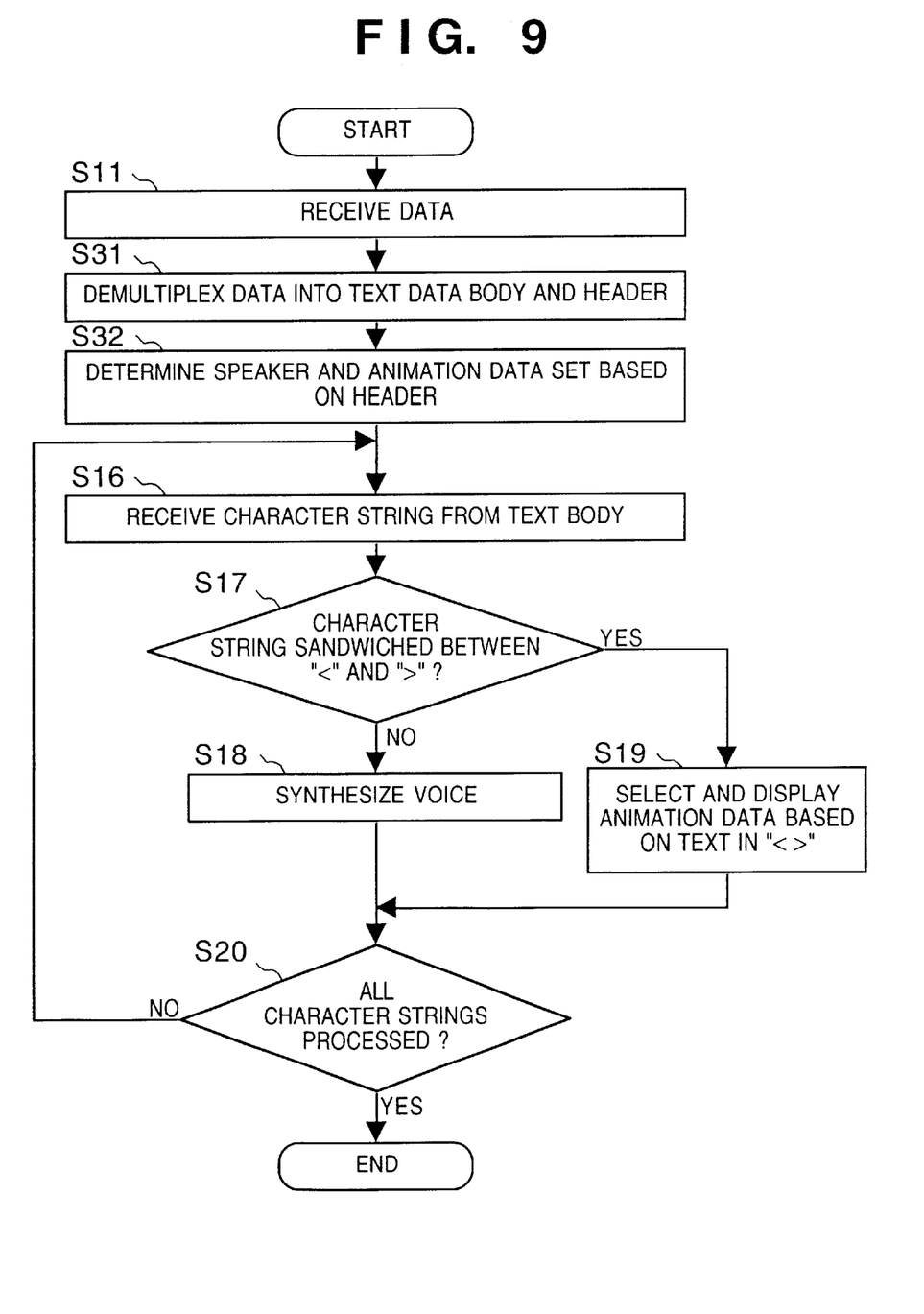
FIG. 9 is a flow chart for explaining animation display and voice synthesis according to the second embodiment.

FIG. 9 is a flow chart for explaining processing upon data reception in the information processing apparatus according to the second embodiment. In FIG. 9, the same step numbers as in the first embodiment (FIG. 5) denote the same steps.

If data is received in step S11, a demultiplexer 107 demultiplexes the received text data into a text body and header in step S31. In step S32, a speaker and animation data set are determined based on the header demultiplexed in step S31. That is, animation data to be displayed in generating a voice is determined based on the name, gender, and mail address contained in the header.

Steps S16 to S20 are the same as those described in the first embodiment. In step S19, animation data to be displayed is selected from the animation data set determined in step S32.

According to the second embodiment, animation data such as a face stored in the external storage device 415 on the receiving side is selected based on person specifying information transmitted from the transmitter. For this reason, the transmitting side need not transmit animation data every transmission, and can transmit only a text and header/tag information to perform voice synthesis/output and animation display in synchronism with each other.

Information (name, gender, mail address, and the like) for specifying a person is superposed on a text. The receiving side collates the information with specific person information stored in the external storage device 415 in advance, and extracts a still image necessary for a matched animation. Thus, the transmitting side need not transmit the still images of the face and body of a person, and transmits only animation information representing the movements and expressions.

[Third Embodiment]

The second embodiment determines animation data to be applied from the gender, name, and mail address contained in text data. However, this determination method must link a transmitter's name to animation data, so cannot cope with many unspecified transmitters. To the contrary, the third embodiment can cope with data from many unspecified transmitters by giving more general attributes to an animation avatar to be applied.

Figure 10A:
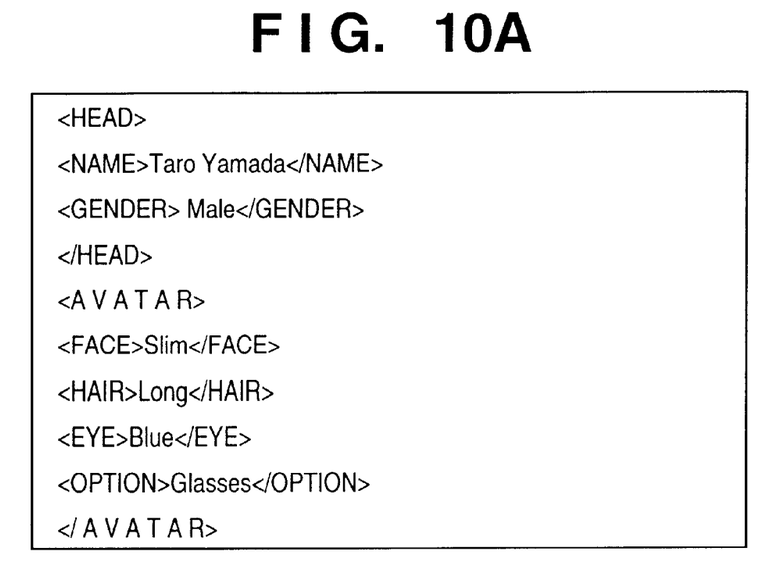
FIGS. 10A to 10C are views showing part of text data according to the third embodiment.
Figure 10B:
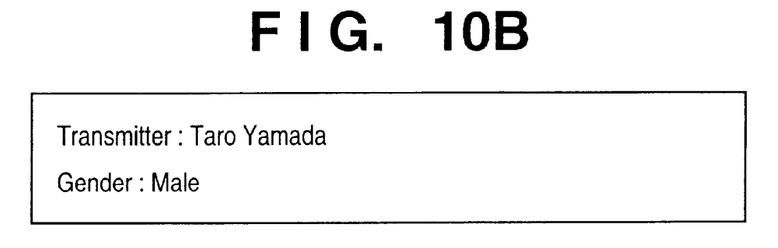
Figure 10C:
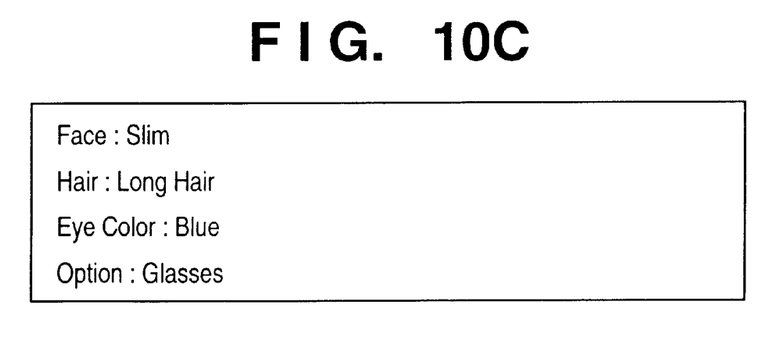

FIGS. 10A to 10C are views showing part of text data according to the third embodiment. The header of the text is sandwiched between <HEAD> and </HEAD>, and represents transmitter information, similar to the example in FIG. 4A. Hence, the same transmitter information as that shown in FIG. 4C can be obtained. This transmitter information is shown in FIG. 10B. <AVATAR> and </AVATAR> subsequent to <HEAD> and </HEAD> are tags representing avatar information. In the third embodiment, the tags <FACE>, <HAIR>, <EYE>, and <OPTION> represent a slim face, long hair, blue eyes, and wearing glasses, respectively.

Figure 11:
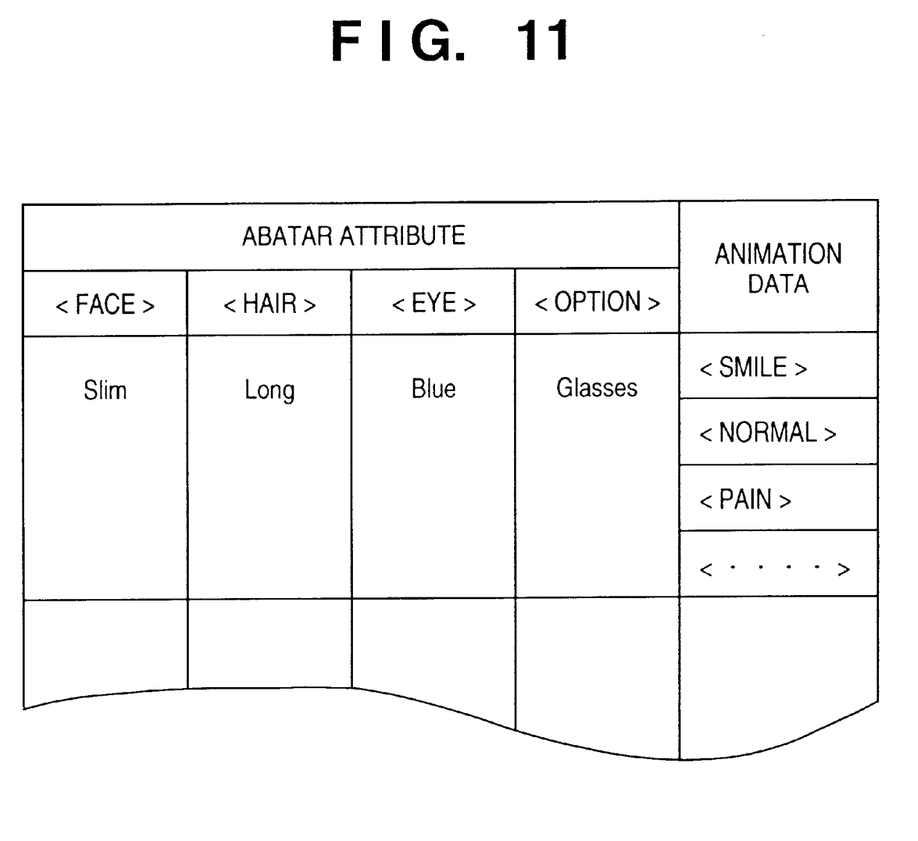
FIG. 11 is a table showing a storage example of animation data according to the third embodiment.

FIG. 11 is a table showing a storage example of animation data according to the third embodiment. As shown in FIG. 11, attributes indicating the face shape (<FACE>), hair length and color (<HAIR>), eye color (<EYE>), and the presence/absence of glasses (<OPTION>) are applied to each animation data set representing the facial expressions. In displaying an animation, a proper animation set is selected and displayed based on avatar information sandwiched between <AVATAR> and </AVATAR> contained in received text data. In other words, an image most suitable for avatar information is selected and read out from an external storage device 415 to easily display an animation.

Note that processing in the third embodiment is similar to that in the second embodiment (FIG. 9) except that attribute information described between <AVATAR> and </AVATAR> is obtained in step S31 in addition to a text data body and header, and data shown in FIG. 11 is searched in step S32 on the basis of the attribute information to determine animation data to be used.

Note that this data merely determines avatar characteristics, and need not always represent transmitter's characteristics.

The present invention may be applied to a system constituted by a plurality of devices (e.g., a host computer, interface device, reader, and printer) or an apparatus comprising a single device (e.g., a copying machine or facsimile apparatus).

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, displaying animation data can be easily, accurately synchronized with reading off text data.

As a result, an image and text with face and body animations can be transmitted by a simple procedure even through a transmission path having a very low rate.

According to the present invention, animation data can be held on the receiving side so as not to transmit animation data every transmission of a text to be read off.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus comprising:
   reception means for receiving data containing animation control information in a text block for voice synthesis;
   storage means for storing animation data;
   voice output means for extracting the text block for voice synthesis from the data received by said reception means, and synthesizing a voice based on the extracted text block to output the voice; and
   display control means for controlling display of the animation data stored in said storage means to synchronize with the voice synthesized by said voice output means, on the basis of a position of the text block output as a voice by said voice output means, and a position of the animation control information in the data.

2. The apparatus according to claim 1, wherein the animation control information contains a predetermined character string.

3. The apparatus according to claim 1, wherein the animation control information specifies an animation expression to be used.

4. The apparatus according to claim 1, wherein the data received by said reception means contains animation data, and
   said storage means extracts and stores the animation data from the data received by said reception means.

5. The apparatus according to claim 1, wherein said storage means stores a plurality of types of animation data in correspondence with attribute information, and
   said apparatus further comprises determination means for determining animation data to be displayed on the basis of attribute information designated by the data received by said reception means.

6. The apparatus according to claim 5, wherein the attribute information contains information for specifying a transmitter, and
   said determination means determines animation data to be applied on the basis of transmitter information described in the data.

7. The apparatus according to claim 6, wherein the information for specifying a transmitter is any one or a combination of a transmitter's name, gender, and mail address.

8. The apparatus according to claim 5, wherein the attribute information contains information representing an image feature of animation data, and
   said determination means determines animation data to be applied on the basis of the image feature described in the data.

9. The apparatus according to claim 8, wherein the attribute information represents a face characteristic indicated by animation data.

10. The apparatus according to claim 1, wherein the animation control information is a text block described at a portion sandwiched between predetermined symbols in the data.

11. The apparatus according to claim 10, wherein said apparatus further comprises:
    extraction means for extracting a text block from the data; and
    judgement means for judging whether the text block is animation control information on the basis of whether the text block extracted by said extraction means is sandwiched between the predetermined symbols,
    said voice output means synthesizes a voice based on the text block to output the voice when the text block extracted by said extraction means is not judged as animation control information by said judgement means, and said display control means controls display of the animation data stored in said storage means on the basis of the text block when the text block extracted by said extraction means is judged as animation control information by said judgement means.

12. An information processing method comprising:

a reception step, of receiving data containing animation control information in a text block for voice synthesis;

a storage step, of storing animation data;

a voice output step, of extracting the text block for voice synthesis from the data received in the reception step to synchronize with the voice synthesized by the voice output step, and synthesizing a voice based on the extracted text block to output the voice; and a display control step, of controlling display of the animation data stored in the storage step, on the basis of a position of the text block output by voice in the voice output step, and a position of the animation control information in the data.

13. The method according to claim 12, wherein the animation control information contains a predetermined character string.

14. The method according to claim 12, wherein the animation control information specifies an animation expression to be used.

15. The method according to claim 12, wherein the data received in the reception step contains animation data, and the storage step comprises extracting and storing the animation data from the data received in the reception step.

16. The method according to claim 12, wherein the storage step comprises storing a plurality of types of animation data in correspondence with attribute information, and the method further comprises a determination step, of determining animation data to be displayed on the basis of attribute information designated by the data received in the reception step.

17. The method according to claim 16, wherein the attribute information contains information for specifying a transmitter, and the determination step comprises determining animation data to be applied on the basis of transmitter information described in the data.

18. The method according to claim 17, wherein the information for specifying a transmitter is any one or a combination of a transmitter's name, gender, and mail address.

19. The method according to claim 16, wherein the attribute information contains information representing an image feature of animation data, and the determination step comprises determining animation data to be applied on the basis of the image feature described in the data.

20. The method according to claim 19, wherein the attribute information represents a face characteristic indicated by animation data.

21. The method according to claim 12, wherein the animation control information is a text block described at a portion sandwiched between predetermined symbols in the data.

22. The method according to claim 21, wherein the method further comprises:

a extraction step, of extracting a text block from the data; and a judgement step, of judging whether the text block is animation control information on the basis of whether the text block extracted in the extraction step is sandwiched between the predetermined symbols, a voice output step, which comprises synthesizing a voice based on the text block to output the voice when the text block extracted in the extraction step is not judged as animation control information in the judgement step, and a display control step, which comprises controlling display of the animation data stored in the storage step on the basis of the text block when the text block extracted in the extraction step is judged as animation control information in the judgement step.

23. An information transmission system comprising:

creation means for creating data containing animation control information in a text block for voice synthesis;

transmission means for transmitting the data created by said creation means;

reception means for receiving the data transmitted by said transmission means;

storage means for storing animation data on a receiving-side apparatus having said reception means;

voice output means for extracting the text block for voice synthesis from the data received by said reception means, and synthesizing a voice based on the extracted text block to output the voice; and display control means for controlling display of the animation data stored in said storage means on the basis of a position of the text block output by voice by said voice output means to synchronize with the voice synthesized by the voice output step, and a position of the animation control information.

24. The system according to claim 23, wherein the animation control information contains a predetermined character string.

25. The system according to claim 23, wherein the animation control information specifies an animation expression to be used.

26. The system according to claim 23, wherein the data received by said reception means contains animation data, and said storage means extracts and stores the animation data from the data received by said reception means.

27. The system according to claim 23, wherein said storage means stores a plurality of types of animation data in correspondence with attribute information, and said system further comprises determination means for determining animation data to be displayed on the basis of attribute information designated by the data received by said reception means.

28. The system according to claim 27, wherein the attribute information contains information for specifying a transmitter, and said determination means determines animation data to be applied on the basis of transmitter information described in the data.

29. The system according to claim 28, wherein the information for specifying a transmitter is any one or a combination of a transmitter's name, gender, and mail address.

30. The system according to claim 27, wherein the attribute information contains information representing an image feature of animation data, and said determination means determines animation data to be applied on the basis of the image feature described in the data.

31. The system according to claim 30, wherein the attribute information represents a face characteristic indicated by animation data.

32. The system according to claim 23, wherein the animation control information is a text block described at a portion sandwiched between predetermined symbols in the data.

33. The system according to claim 32, wherein said system further comprises:

extraction means for extracting a text block from the data; and judgement means for judging whether the text block is animation control information on the basis of whether the text block extracted by said extraction means is sandwiched between the predetermined symbols, said voice output means synthesizes a voice based on the text block to output the voice when the text block extracted by said extraction means is not judged as animation control information by said judgement means, and said display control means controls display of the animation data stored in said storage means on the basis of the text block when the text block extracted by said extraction means is judged as animation control information by said judgement means.

34. A storage medium which stores a control program for causing a computer to perform voice synthesis and animation display on the basis of data containing animation control information in a text block for voice synthesis, the control program comprising:

a code of a reception step, of receiving data containing animation control information in a text block for voice synthesis;

a code of a storage step, of storing animation data;

a code of a voice output step, of extracting the text block for voice synthesis from the data received in the reception step, and synthesizing a voice based on the extracted text block to output the voice; and a code of a display control step, of controlling display of the animation data stored in the storage step to synchronize with the voice synthesized by the voice output step, on the basis of a position of the text block output by voice in the voice output step, and a position of the animation control information.

* * * * *